(12) United States Patent
Ko et al.

(10) Patent No.: US 8,724,444 B2
(45) Date of Patent: May 13, 2014

(54) METHOD AND APPARATUS FOR FORMING SIGNALS IN WIRELESS COMMUNICATION SYSTEMS

(75) Inventors: Young-Jo Ko, Daejeon (KR);
Hyeong-Geun Park, Daejeon (KR);
Il-Gyu Kim, Chungcheongbuk-do (KR);
Kapseok Chang, Daejeon (KR);
Hyoseok Yi, Daejeon (KR);
Young-Hoon Kim, Daejeon (KR);
Seung-Chan Bang, Daejeon (KR)

(73) Assignees: Electronics and Telecommunications Research Institute, Daejeon (KR);
Samsung Electronics Co., Ltd., Gyeonggi-do (KR)

( * ) Notice: Subject to any disclaimer, the term of this patent is extended or adjusted under 35 U.S.C. 154(b) by 71 days.

(21) Appl. No.: 13/589,566

(22) Filed: Aug. 20, 2012

(65) Prior Publication Data

US 2012/0307789 A1    Dec. 6, 2012

Related U.S. Application Data

(62) Division of application No. 12/672,427, filed as application No. PCT/KR2008/004645 on Aug. 8, 2008, now abandoned.

(30) Foreign Application Priority Data

Aug. 8, 2007    (KR) .................. 10-2007-0079785
Aug. 14, 2007   (KR) .................. 10-2007-0081546
Aug. 17, 2007   (KR) .................. 10-2007-0082934
Aug. 24, 2007   (KR) .................. 10-2007-0085695
Aug. 7, 2008    (KR) .................. 10-2008-0077547

(51) Int. Cl.
*H04J 11/00*    (2006.01)
*H04Q 7/00*    (2006.01)

(52) U.S. Cl.
USPC ........................................ 370/203; 370/328

(58) Field of Classification Search
USPC .................. 370/203, 208, 328, 329, 338, 341
See application file for complete search history.

(56) References Cited

U.S. PATENT DOCUMENTS 6,111,869 A    8/2000    Esmailzadeh et al.
6,657,985 B1   12/2003   Park (Continued)

FOREIGN PATENT DOCUMENTS

CN    1378723 A    11/2002
CN    1428948 A    7/2003

(Continued)

OTHER PUBLICATIONS

ETRI; "Code hopping for uplink ACK/NAK channels", 3GPP TSG RAN WG1 Meeting #49bis, Orlando, USA, Jun. 25-29, 2007; R-072814, 4 pages.

(Continued)

*Primary Examiner* — Hong Cho
(74) *Attorney, Agent, or Firm* — Ladas & Parry LLP

(57) ABSTRACT

Provided is method of forming a signal in a wireless communication system in which a plurality of terminals commonly use a resource in the time domain and the frequency domain. The method includes multiplying a signal to be transmitted by a frequency domain orthogonal code symbol corresponding to a first cyclic shift index in a first slot to be transmitted to a base station, wherein the multiplying is performed by a first terminal and a second terminal; and multiplying information to be transmitted by a frequency domain orthogonal code symbol corresponding to a second cyclic index that is different from the first cyclic index of the first slot to be transmitted to the base station, in a second slot, wherein the multiplying is performed by the first terminal and the second terminal.

16 Claims, 5 Drawing Sheets

(56) References Cited

U.S. PATENT DOCUMENTS

| | | | |
|---|---|---|---|
| 7,633,996 B2* | 12/2009 | Haentzschel et al. | 375/150 |
| 8,406,201 B2* | 3/2013 | Vujcic | 370/335 |
| 2003/0087603 A1 | 5/2003 | Li et al. | |
| 2005/0201270 A1 | 9/2005 | Song et al. | |
| 2006/0018412 A1 | 1/2006 | Jung et al. | |
| 2006/0203707 A1 | 9/2006 | Lee et al. | |
| 2007/0253465 A1* | 11/2007 | Muharemovic et al. | 375/130 |

FOREIGN PATENT DOCUMENTS

| | | |
|---|---|---|
| WO | 2006/069299 A1 | 6/2006 |
| WO | 2007/055527 A1 | 5/2007 |

OTHER PUBLICATIONS

ETRI; "Non-coherent ACK/NAK signaling using code sequences as indicators in E-UTRA uplink", 3GPP TSG RAN WG1 Meeting #47bis Sorrento, Italy, Jan. 15-19, 2007; R1-070078, 7 pages.

ETRI; "ACK/NACK performance of high speed UEs", 3GPP TSG RAN WG1 Meeting #49bis Orlando, USA, Jun. 25-29, 2007; R1-073002; 4 pages.

Nokia Siemens Networks, Nokia; "Randomization for ACK/NACK signals transmitted on PUCCH", 3GPP TSG RAN WG1 Meeting #49bis Orlando, USA, Jun. 25-29, 2007; R1-073005; 4 pages.

KDDI; "Uplink Data-non-associated Control Signaling in E-UTRA", 3GPP TSG RAN WG1 Meeting #49bis Orlando, USA, Jun. 25-29, 2007; R1-073072, 5 pages.

Panasonic; "Usage of Cyclic Shifts and block-wise spreading codes for Uplink ACK/NACK", 3GPP TSG RAN WG1 Meeting #49bis Orlando, USA, Jun. 25-29, 2007; R1-072799; 2 pages.

Japanese Office Action; dated Feb. 19, 2013; Appln. No. 2010-519872.

Motorola; "Reference Signal Structure for UL ACK/NACK", 3GPP Draft; R1-072187 UL_ACK_RS, $3^{rd}$ Generation Partnership Project (3GPP), Mobile Competence Centre; 650, Route Des Lucioles, F-06921 Sophia-Antipolis Cedes; France, vol. RAN WG1, No. Kobe, Japan, May 2, 2007, XP050105927, [retrieved on May 2, 2007], the whole document, 3 pages.

NTT DOCOMO et al; "CDMA-Based Multiplexing Method for Multiple ACK/NACK and CQI in E-UTRA Uplink", 3GPP Draft; R1-070100 UL CDMA-Based Multiplexing of Multiple ACK and CQI, $3^{rd}$ Generation Partnership Project (3GPP), Mobile Competence Centre; 650, Route Des Lucioles, F-06921 Sophia-Antipolis Cedes; France, vol. RAN WG1, No. Sorrento, Italy; Jan. 10, 2007, XP050104152; [retrieved on Jan. 10, 2007] the whole document, 7 pages.

USPTO NFOA mailed Dec. 20, 2011 in connection with U.S. Appl. No. 12/672,427.

European Search Report; dated Apr. 19, 2012; EP 08 79 3159.

International Search Report; PCT/KR2008/004645.

First Chinese Office Action dated Oct. 18, 2012; Appln. No. 2008801107390.

* cited by examiner

METHOD AND APPARATUS FOR FORMING SIGNALS IN WIRELESS COMMUNICATION SYSTEMS

TECHNICAL FIELD

The present invention relates to a method of effectively reducing interference between terminals when transmitting a control signal of data received from a terminal base station in a wireless communication system.

When a plurality of users (terminals) simultaneously use an acknowledgement/negative acknowledgement (ACK/NAK) channel in a wireless communication system, a code division multiplexing (CDM) technique may be used in the plurality of terminals. In CDM, each of the plurality of terminals transmits a result obtained by multiplying a signal to be transmitted by a spreading code allocated to each of the plurality of terminals.

The present invention relates to a code hopping method of effectively reducing interference between terminals in the same cell and interference of terminals between different cells when a plurality of terminals use two spreading codes, that is, both a spreading code in the frequency domain (frequency domain) and a spreading code in the time domain (time domain).

In addition, the present invention relates to identifying signals of a plurality of terminals when the plurality of terminals use a spreading code in the frequency domain and a spreading code in the time domain.

The present invention is supported by the Information Technology (IT) Research & Development (R&D) program of the Ministry of Information and Communication (MIC) and the Institute for Information Technology Advancement (IITA) [Project management No.: 2005-S-404-13, Research title: Research & Development of Radio Transmission Technology for 3G Evolution].

BACKGROUND ART

In a wireless communication system, a receiver transmits acknowledgement (ACK) and negative acknowledgement (NAK) signals to a transmitter when received data is successfully and unsuccessfully demodulated, respectively. An ACK/NAK signal requires one bit per codeword.

An ACK/NAK signal needs to be simultaneously transmitted by a plurality of users by using predetermined time and frequency resources. Such multiplexing techniques are classified into frequency division multiplexing (FDM) and code division multiplexing (CDM). FDM is a form of multiplexing where a plurality of different terminals use different time/frequency resources, whereas CDM is a form of multiplexing where a plurality of different terminals use the same time/frequency resources but transmit results obtained by multiplying signals by specific orthogonal codes so that a receiver can identify the plurality of different terminals.

In an uplink, a Zadoff-Chu sequence having an ideal peak to average power ratio (PAPR) is often used. Such a Zadoff-Chu sequence can achieve orthogonality between terminals through a cyclic delay, instead of multiplying a signal by a specific code in the frequency domain.

An uplink ACK/NAK signal is required for a terminal to inform a base station about a successful or unsuccessful (ACK or NAK) receipt of downlink data, and is used to transmit the downlink data.

FIG. 1 illustrates time/frequency resources used by a terminal to perform uplink ACK/NAK signaling in a 3rd generation partnership projection long term evolution (3GPP LTE) system.

Referring to FIG. 1, resources used by one control channel are grouped into two separate resource blocks. Each of the two resource blocks includes N subcarriers along a frequency domain, and 7 orthogonal frequency division multiplexing (OFDM) symbols, which correspond to one slot, in a time domain. One slot has a time duration of 0.5 ms.

In FIG. 1, a plurality of terminals may commonly use one control channel. That is, a control channel A or a control channel B may be shared by the plurality of terminals. In this case, in order to identify the plurality of terminals using the same control channel, a specific code sequence is allocated to each of the plurality of terminals. That is, each of the plurality of terminals generates and transmits a signal spread along a frequency domain and a time domain by using its allocated specific code.

FIG. 2 illustrates a code sequence and a symbol transmitted to each of N subcarriers in an ACK/NAK channel occupying a resource block that includes the N subcarriers in a frequency domain and 7 OFDM symbols in a time domain. In FIG. 2, the resource block corresponding to one slot described with reference to FIG. 1 occupies N subcarriers in the frequency domain and includes 7 symbol blocks BL #0 through #6 in the time domain.

When CDM is used to identify signals of a plurality of terminals, a sequence and a symbol may be mapped to each time/frequency resource as illustrated in FIG. 2. In order to identify the signals of the plurality of terminals, a sequence is applied to each of the frequency domain and the time domain. In FIG. 2, a reference signal is used for channel estimation, and a pre-determined signal between a terminal and a base station is transmitted.

The base station estimates a channel by using the reference signal, and uses a result of the channel estimation so as to demodulate an ACK/NAK symbol transmitted by a control signal. Each time/frequency resource carries a signal multiplied by two or three symbols.

That is, a time/frequency resource on which the reference signal is carried, is obtained by multiplying a frequency domain sequence symbol $C_q^m(k)$ by a time domain sequence symbol Ri (i=0, 1, 2). A time/frequency resource on which the control signal is carried, is obtained by multiplying a frequency domain sequence symbol $C_q^m(k)$, a time domain sequence symbol Ci (i=0, 1, 2, 3), and an ACK/NAK symbol Q.

In FIG. 2, the frequency domain sequence symbol $C_q^m(k)$ indicates a Zadoff-Chu sequence where $N_{ZC}$ is the length of the Zadoff-Chu sequence applied to a $k_{th}$ subcarrier in a frequency domain, m is a primary index, and q is a cyclic delay index, and is given by Equation 1.

$$C_q^m(k) = \exp\left[i\frac{2\pi}{N_{ZC}}m\left(\frac{(k-q)(k-q+1)}{2}\right)\right], k = 0, 1, 2, \ldots, N-1 \quad (1)$$

One sequence is applied to each of the reference signal and the control signal in a time domain. That is, a sequence applied to the control signal in FIG. 2 is expressed as $C_0$, $C_1$, $C_2$, and $C_3$. A sequence applied to the reference signal is expressed as $R_0$, $R_1$, and $R_2$.

Currently, 3GPP LTE considers a configuration in which three reference signals per slot are used for an uplink ACK/NAK channel.

Also, in order to identify a plurality of terminals, a Zadoff-Chu sequence is used along a frequency domain, and a discrete Fourier transformation (DFT) vector, a Walsh-Hadamard sequence, or a Zadoff-Chu sequence may be used in a time domain.

A time domain sequence used for a time domain CDM uses sequences orthogonal to each other. When the number of continuous OFDM symbols along a time domain is $N_t$, $N_t$ sequences that are orthogonal to each other can be created, wherein the length of the sequences is $N_t$. When an $i^{th}$ sequence is defined as a row vector $Gi=[C_{i,0}, C_{i,1}, \ldots, C_{i,N_t-1}]$, the orthogonality of the sequences to each other is defined as follows.

$$G_i \cdot G_j^+ = [C_{I,0}, C_{I,1}, \ldots C_{I,N_t-1}] \cdot \begin{bmatrix} C_{j,0}^* \\ C_{j,1}^* \\ \vdots \\ C_{j,N_t-1}^* \end{bmatrix} = \sum_{k=0}^{N_t-1} C_{I,k} C_{j,k}^* = N_t \delta_{i,j}$$

$$\text{where } \delta_{i,j} = \begin{cases} 1 & \text{if } i = j \\ 0 & \text{if } i \neq j \end{cases}$$

Theoretically, since the number of resources in the frequency domain is M, and each resource includes three reference signals, as illustrated in FIGS. 3, 4 and 5, M×3 reference signals can be identified by CDM.

Also in the case of a control signal, since the number of resources in the frequency domain is M, and each resource includes four control signals, as illustrated in FIGS. 3, 4 and 5, M×4 control signals can be identified by CDM. However, since each terminal needs to transmit at least one reference signal so that a base station can demodulate a control signal by using the reference signal, the number of terminals that can be identified is M×3. In this case, an orthogonal sequence with a spreading (SF) of 3 is used for the reference signal, and an orthogonal sequence with an SF of 4 is used for the control signal.

DETAILED DESCRIPTION OF THE INVENTION

Technical Problem

Figure 1:
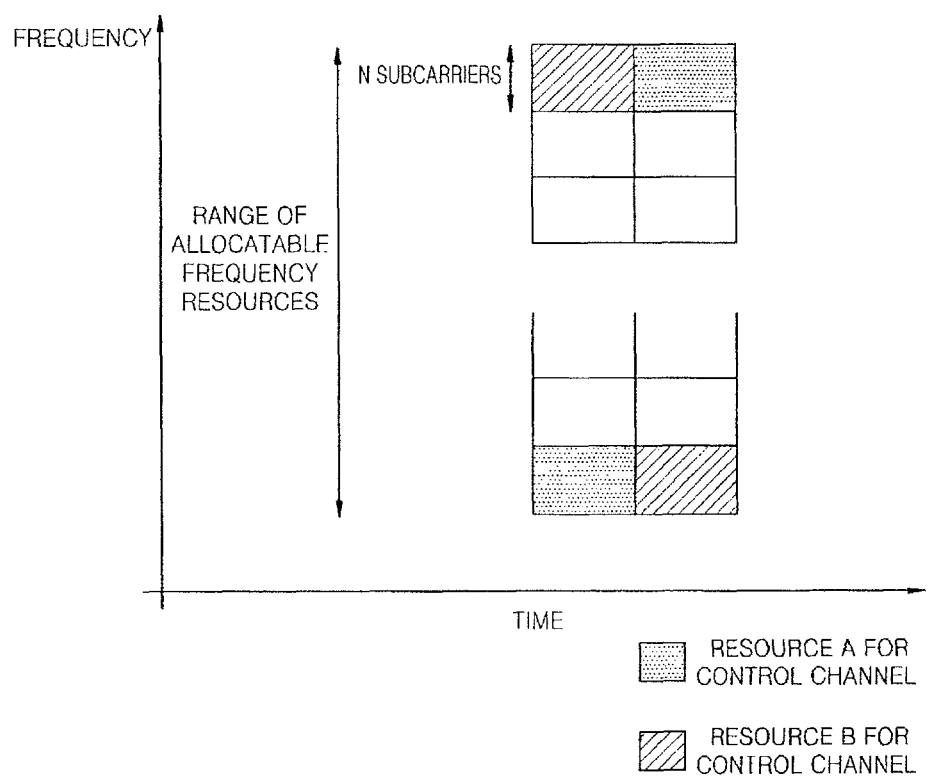
FIG. 1 illustrates time/frequency resources used by a terminal to transmit an uplink acknowledgement/negative acknowledgement (ACK/NAK) signal through a control channel in a 3$^{rd}$ generation partnership projection long term evolution (3GPP LTE) system.
Figure 2:
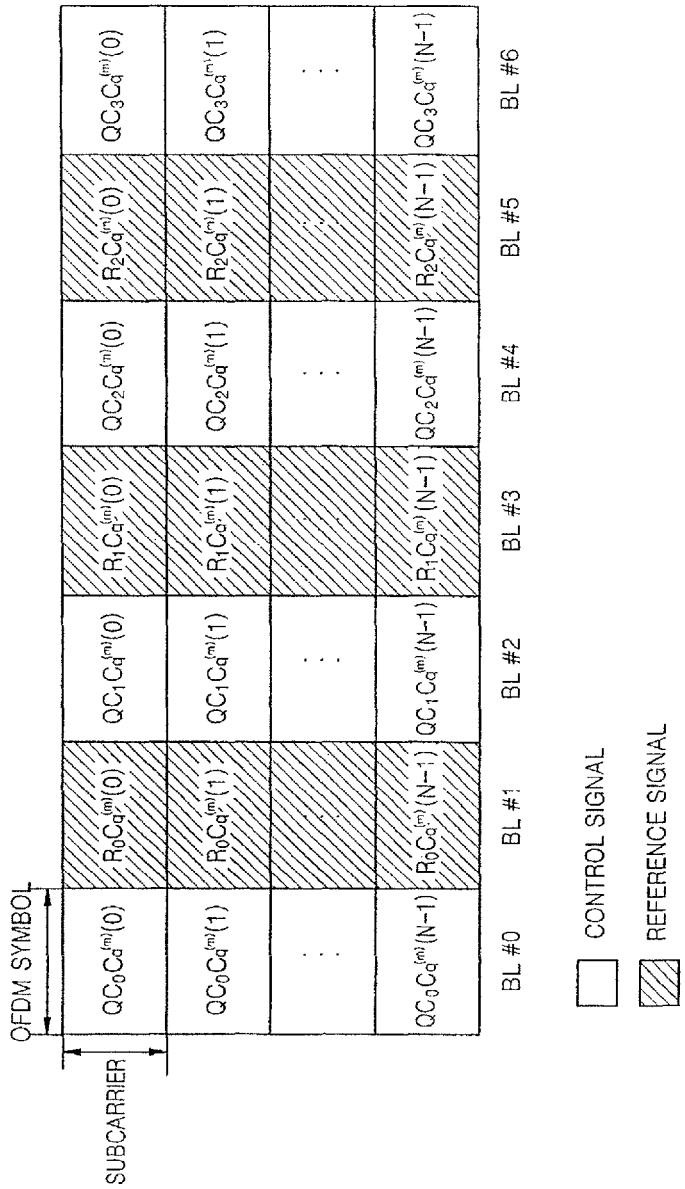
FIG. 2 illustrates a code sequence and a symbol transmitted to each of N subcarriers in an acknowledgement/negative acknowledgement (ACK/NAK) channel occupying a resource block that includes the N subcarriers in the frequency domain and 7 orthogonal frequency division multiplexing (OFDM) symbols in the time domain.

When a plurality of terminals share the same resources in a wireless communication system, and when control information such as acknowledgement/negative acknowledgement (ACK/NAK) information or scheduling information is transmitted, a method of efficiently performing code division multiplexing (CDM) is required to identify the plurality of terminals.

In order to transmit and receive the control information such as the ACK/NAK information or the scheduling information, a plurality of users (terminals) use the same ACK/NAK resources. At this time, terminals in the same cell and terminals between different cells interfere with each other. An efficient code hopping method is required to reduce such interference.

Technical Solution

According to an aspect of the present invention, there is provided a method of forming a signal in a wireless communication system in which a plurality of terminals commonly use a resource in a time domain and a frequency domain, the method comprising: multiplying a signal to be transmitted by a frequency domain orthogonal code symbol corresponding to a first cyclic shift index in a first slot to be transmitted to a base station, wherein the multiplying is performed by a first terminal and a second terminal; and multiplying information to be transmitted by a frequency domain orthogonal code symbol corresponding to a second cyclic index that is different from the first cyclic index of the first slot to be transmitted to the base station, in a second slot, wherein the multiplying is performed by the first terminal and the second terminal.

According to another aspect of the present invention, there is provided a method of forming a signal in a wireless communication system in which a plurality of terminals commonly use a resource having a frequency domain and a time domain, the method comprising: multiplying a signal to be transmitted by a frequency domain orthogonal code symbol corresponding to a first cyclic shift index in a first slot to be transmitted to a base station, wherein the multiplying is performed by a first terminal and a second terminal; receiving an allocation of a second cyclic shift index that is different from the first cyclic shift index of the first slot, in a second slot, wherein the receiving is performed by the first terminal and the second terminal; and exchanging a time domain orthogonal cover index in the first slot in the second slot, wherein the exchanging is performed by the first terminal and the second terminal.

According to another aspect of the present invention, there is provided a method of forming a signal in a wireless communication system in which a plurality of terminals commonly use a resource having a frequency domain and a time domain, the method comprising: multiplying information to be transmitted by a frequency domain orthogonal code symbol corresponding to a first cyclic shift index in a first slot to be transmitted to a base station, wherein the multiplying is performed by a first terminal and at least one second terminal; multiplying information to be transmitted by a frequency domain orthogonal code symbol corresponding to a second cyclic shift index that is different from the first cyclic shift index in a second slot to be transmitted to the base station, where the multiplying is performed by the first terminal; and multiplying information to be transmitted by a frequency domain orthogonal code symbol corresponding to a third cyclic shift index that is different from the first and second cyclic shift indices in the second terminal to be transmitted to the base station.

According to another aspect of the present invention, there is provided a method of forming a signal in a wireless communication system in which a plurality of terminals commonly use a resource having a frequency domain and a time domain, the method comprising: multiplying a signal to be transmitted by a first cyclic shift index and a first time domain orthogonal cover index in a first slot to be transmitted to a base station, wherein the multiplying is performed by a terminal; and multiplying information to be transmitted by a second cyclic shift index and a second time domain orthogonal cover index in a second slot, where the multiplying is performed by the terminal.

According to another aspect of the present invention, there is provided a method of forming a signal in a wireless communication system in which a plurality of terminals commonly use a resource having a frequency domain and a time domain, the method comprising: receiving an allocation of at least one of N−1 time domain orthogonal cover indices with respect to N control signal blocks in a first slot, wherein the receiving is performed by a first terminal group formed by a first terminal together with at least one other terminal, wherein the N−1 time domain orthogonal cover index is allocated to at least one terminal; receiving an allocation of a time domain orthogonal cover index that is not allocated in the first terminal group including the first terminal in a second slot; and using the same time domain orthogonal cover index allocated in the first slot, in the second slot, wherein the using is performed by terminals that are not from the first terminal group.

According to another aspect of the present invention, there is provided a method of forming a signal in a wireless communication system in which a plurality of terminals commonly use a resource having a frequency domain and a time domain, the method comprising: receiving an allocation of a cyclic shift index from a base station in a first slot, wherein the receiving is performed by a terminal; receiving an allocation of different time domain orthogonal cover indices from the base station in the first slot, wherein the receiving is performed by the terminal and a second terminal; receiving an allocation of the same cyclic shift index allocated in the first slot from the base station, in a second slot, wherein the receiving is performed by the terminal and the second terminal; and exchanging a time domain orthogonal cover index allocated in the first slot from the base station in the second slot to receive an allocation of a time domain orthogonal cover index, wherein the exchanging is performed by the terminal and the second terminal.

Advantageous Effects

According to the present invention, when a plurality of terminals use two spreading codes, that is, both a spreading code along a frequency domain and a spreading code along a time domain, in a wireless communication system, interference between terminals in the same cell and interference between terminals in different cells can be efficiently reduced.

BEST MODE

A code hopping method and apparatus for reducing interference between terminals in a wireless communication system will now be described more fully with reference to the accompanying drawings, in which exemplary embodiments of the invention are shown.

A detailed explanation will not be provided when it is determined that detailed explanations about well-known functions and configurations of the present invention may distract from the main point of the present invention. Terms used hereinafter are used considering the functions in the present invention and may be changed according to a user's or an operator's intention or usual practice. Accordingly, the terms will be defined based on the entire content of the description of the present invention.

In particular, the term "frequency domain code" or "frequency domain code index" used hereinafter is interchangeable with "cyclic shift" or "cyclic shift index," and the term "time domain code" or "time domain code index" used hereinafter is interchangeable with "orthogonal cover" or "time domain orthogonal cover index". If necessary, the term "time domain orthogonal cover index" is interchangeable with "Walsh sequence index".

In the present invention, control information may include an acknowledgement/negative acknowledgement (ACK/NACK(NAK)) signal, scheduling request information, channel quality indication (CQI) information, precoding matrix indicator (PMI) information, rank indication (RI) information, etc., but the present invention is not limited thereto.

Figure 3:
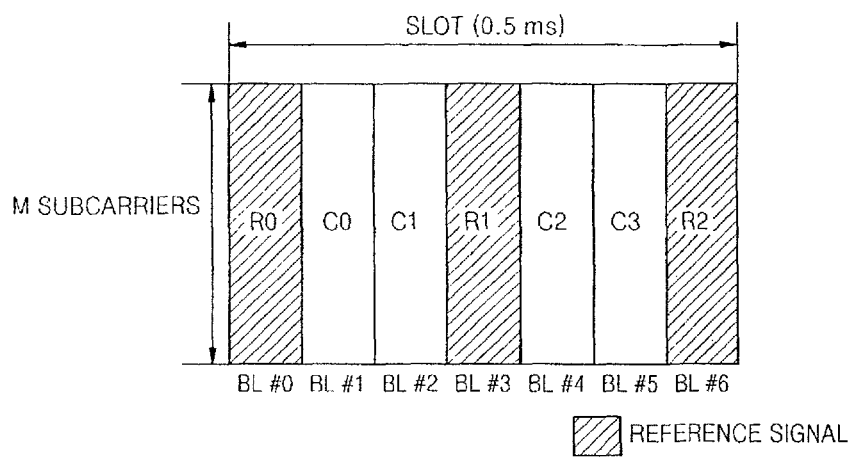
FIG. 3 illustrates a slot structure of an ACK/NAK channel including 3 reference signals per slot, according to an embodiment of the present invention.
Figure 4:
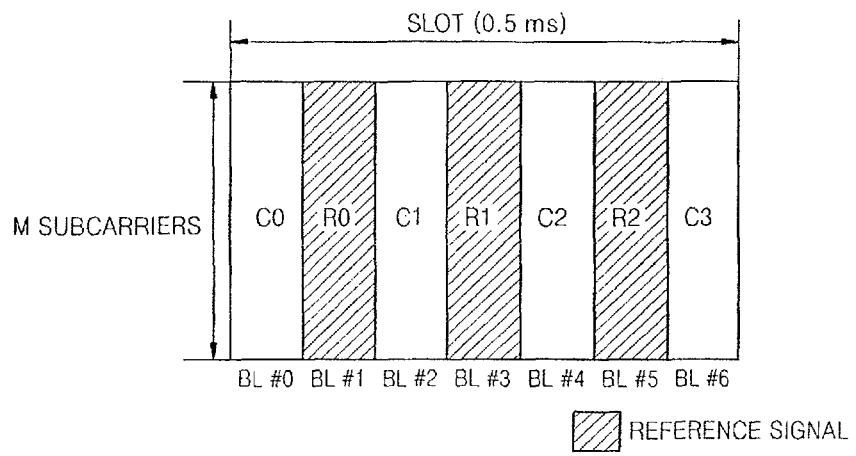
FIG. 4 illustrates a slot structure of an ACK/NAK channel including 3 reference signals per slot, according to another embodiment of the present invention.
Figure 5:
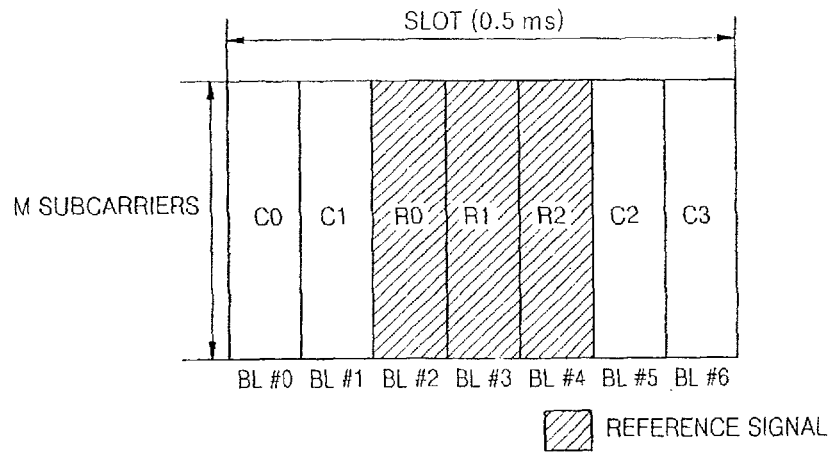
FIG. 5 illustrates a slot structure of an ACK/NAK channel including 3 reference signals per slot, according to another embodiment of the present invention.

FIGS. 3 through 5 illustrate slot structures of an ACK/NAK channel, including 3 reference signals, according to embodiments of the present invention.

Referring to FIGS. 3 through 5, one slot includes 3 reference signals and 4 control signals.

A method of allocating a sequence to a terminal via a control information channel will be described. In the present invention, the control information channel has 12 cyclic shifts (CSs) along a frequency domain, and has 3 discrete Fourier transformation (DFT) sequences for a reference signal and 4 Walsh sequences for a control signal along a time domain, as time/frequency resources.

Sequences used in the present invention are defined as follows.

$C_q^m(k)$ indicates a Zadoff-Chu sequence where a length applied to a $k_{th}$ subcarrier is 12, m is a primary index, q is a cyclic delay index, and is given by Equation 2.

$$C_q^m(k) = \exp\left[i\frac{2\pi}{N_{ZC}}m\left(\frac{(k-q)(k-q+1)}{2}\right)\right], \quad (2)$$

$$k = 0, 1, 2, \ldots, 11, q = 0, 1, 2, \ldots, 11$$

$D_r(k)$ indicates a DFT sequence where a length applied to a $k_{th}$ reference signal block is 3 and "r" is a sequence index, and is given by Equation 3.

$$D_r(k) = \exp\left[i\frac{2\pi}{3}rk\right], k = 0, 1, 2, r = 0, 1, 2 \quad (3)$$

$W_r(k)$ is a Walsh sequence where a length applied to a $k_{th}$ signal block is 4 and r is a sequence index, and is given by Equation 1.

In the present invention, when the number of sequences is N and two sequence indices "s" and "r" satisfy the following conditions, it is defined that the two sequences are adjacent to each other.

$$s = (r+1) \bmod N \quad (4)$$

A Walsh sequence defined in Table 1 has properties in which two adjacent sequences each having a sequence index r have orthogonality in units of a length 2.

That is,

If s=(r+1)mod 4, $$\sum_{k=0}^{1} W_r(k)W_s(k) = 0 \text{ and } \sum_{k=2}^{3} W_r(k)W_s(k) = 0.$$

TABLE 1

$W_r(k)$
Walsh sequence

| r | k=0 | k=1 | k=2 | k=3 |
|---|---|---|---|---|
| 0 | 1 | 1 | 1 | 1 |
| 1 | 1 | −1 | 1 | −1 |
| 2 | 1 | 1 | −1 | −1 |
| 3 | 1 | −1 | −1 | 1 |

For the reference signal, when a cyclic shift index is indicated by "q" and a DFT sequence index is incited by "r", a resource allocated to a terminal may be indicated by (q, r), where q=0, 1, 2, through to 10 or 11 and r=0, 1 or 2.

For the control signal, when a cyclic shift index is indicated by "q" and a Walsh sequence index is indicated by "r", a resource allocated to a terminal may be indicated by (q, r), where q=0, 1, 2, through to 10 or 11 and r=0, 1, 2 or 3.

In addition, the method of allocating a sequence to a terminal may satisfy the following rules.

(1) Allocation of Sequence of Reference Signal

First, 2 is the maximum number of terminals having the same cyclic shift index "q" which are allowed in order to minimize the number of terminals having the same cyclic shift index so as to reduce the number of terminals interfering with each other. This is because a terminal moving at high speed greatly interferes with another terminal having the same cyclic shift index of the terminal.

Second, terminals using the same DFT sequence index "r" are allocated so that a cyclic shift index difference between the terminals is maintained as 2 or more. This is because when two terminals use the same DFT sequence, the smaller a cyclic shift index difference between the terminals, the greater the amount of interference between each of the terminals. In particular, when the cyclic shift index difference between terminals is 1, the terminals greatly interfere with each other. Terminals using the same DFT sequence index "r" are maintained so that the minimum distance between cyclic shift indices is equal to or greater than 2.

Table 2 shows an embodiment of the present invention. Resources allocated to terminals in order to transmit a reference signal are expressed as a cyclic shift index and a DFT sequence index.

Table 2 shows the case where the number of resources is 12×3=36 and 18 resources are used from among the total resources. It can be seen that the number of terminals having the same cyclic shift index is 1 or 2. In addition, it can be seen that all distances between cyclic shift indices between terminals using the same. DFT sequence are a length of 2.

(2) Allocation of Sequence of Control Signal

First, a maximum of 2 terminals having the same cyclic shift index are allowed as the maximum number in order to reduce the number of terminals having the same cyclic shift index. This is because a terminal moving at high speed greatly interferes with another terminal having the same cyclic shift index of the terminal.

Second, the orthogonality of a Walsh sequence allocated to two terminals having the same cyclic shift index needs to be satisfied with respect to a length 2. The better maintained orthogonality of a time domain sequence, the shorter a length of the time domain sequence compared to a coherence length of a terminal. Also, the higher the speed of the terminal, the shorter the coherence length. Thus, in order to maintain orthogonality among a plurality of high-speed terminals, the length of the time domain sequence for achieving orthogonality should ideally be short.

In Table 1, orthogonality between two predetermined Walsh sequences is achieved when the two Walsh sequences are correlated with respect to a length 4. However, when sequence indices "r" are adjacent to each other, orthogonality between the two Walsh sequences is achieved even if the two Walsh sequences are correlated with respect to a length 2. That is, when two terminals have the same cyclic shift index, Walsh sequence indices allocated to the two terminals may use sequence indices adjacent to each other in order to maintain orthogonality.

Third, terminals using the same Walsh sequence are allocated so that a cyclic shift index difference is equal to or greater than 2. This is because when two terminals use the same Walsh sequence, the smaller a cyclic shift index difference between the two terminals, the more interference experienced by the two terminals. In particular, since when an index difference is 1, the two terminals greatly interfere with each other, the minimum distance may be equal to or greater than a length of 2.

Table 3 shows embodiment of the present invention. Resources allocated to terminals in order to transmit a control signal are expressed as a cyclic shift index and a Walsh sequence index.

Table 3 shows the case where the number of resources is 12×4=48 and 18 resources are used from among the total resources. It can be seen that the number of terminals having the same cyclic shift index is 1 or 2, which satisfies the first condition. Since terminals using the same cyclic shift index always have Walsh sequence indices (defined in Table 1) adjacent to each other, the terminals satisfy orthogonality with a length 2, which satisfies the second condition. It can be seen that a cyclic shift index difference between terminals using the same Walsh sequence is equal to or greater than a length of 2, which satisfies the third condition.

TABLE 2

Example of sequence allocation of reference signal

| Cyclic shift index | DFT sequence index | | |
|---|---|---|---|
| | 0 | 1 | 2 |
| 0 | ○ | | ○ |
| 1 | | ○ | |
| 2 | ○ | | ○ |
| 3 | | ○ | |
| 4 | ○ | | ○ |
| 5 | | ○ | |
| 6 | ○ | | ○ |
| 7 | | ○ | |
| 8 | ○ | | ○ |
| 9 | | ○ | |
| 10 | ○ | | ○ |
| 11 | | ○ | |

TABLE 3

Example of sequence allocation of control signal

| Cyclic shift index | Walsh sequence index | | | |
|---|---|---|---|---|
| | 0 | 1 | 2 | 3 |
| 0 | ○ | ○ | | |
| 1 | | | | ○ |
| 2 | | ○ | ○ | |
| 3 | ○ | | | |
| 4 | | | ○ | ○ |
| 5 | | ○ | | |
| 6 | ○ | | | ○ |
| 7 | | | ○ | |
| 8 | ○ | ○ | | |
| 9 | | | | ○ |
| 10 | | ○ | ○ | |
| 11 | | | | ○ |

<Order of Sequence Allocation>

Table 4 shows the order of the sequence allocation shown in Table 2, according to another embodiment of the present invention. As shown in Table 4, a sequence is allocated to 6 terminals while maintaining a DFT sequence index as a single value and changing a cyclic shift index. Cyclic shift indices can be allocated up to 18 terminals as the maximum number of terminals. However, when a smaller than the maximum number of terminals are allocated, the allocation order may be determined so as to have a great cyclic shift index difference between the allocated terminals. For example, when only two terminals are allocated, (0, 0) is allocated to a terminal #1, and (6, 0) is allocated to a terminal #2. In this case, a cyclic shift index difference between two terminals is a length of 6, which is the greatest.

TABLE 4

Example of sequence allocation of reference signal and order of the sequence allocation

| Cyclic shift index | DFT sequence index | | |
|---|---|---|---|
| | 0 | 1 | 2 |
| 0 | 1 | | 13 |
| 1 | | 7 | |
| 2 | 3 | | 15 |
| 3 | | 9 | |
| 4 | 5 | | 17 |
| 5 | | 11 | |
| 6 | 2 | | 14 |
| 7 | | 8 | |
| 8 | 4 | | 16 |
| 9 | | 10 | |
| 10 | 6 | | 18 |
| 11 | | 12 | |

TABLE 5

Example of sequence allocation of control signal and order of the sequence allocation

| Cyclic shift index | Walsh sequence index | | | |
|---|---|---|---|---|
| | 0 | 1 | 2 | 3 |
| 0 | 1 | 7 | | |
| 1 | | | | 13 |
| 2 | | 2 | 8 | |
| 3 | 14 | | | |
| 4 | | | 3 | 9 |
| 5 | | 15 | | |

TABLE 5-continued

Example of sequence allocation of control signal and order of the sequence allocation

| Cyclic shift index | Walsh sequence index | | | |
|---|---|---|---|---|
| | 0 | 1 | 2 | 3 |
| 6 | 10 | | | 4 |
| 7 | | | 16 | |
| 8 | 5 | 11 | | |
| 9 | | | | 17 |
| 10 | | 6 | 12 | |
| 11 | | | | 18 |

The case where a sequence is allocated to 12 terminals will be described. Tables 6 and 7 show the case where a sequence is allocated to 12 terminals.

Table 6 shows the case where a sequence of a reference signal is allocated, according to an embodiment of the present invention. Table 7 shows the case where a sequence of a control signal is allocated, according to an embodiment of the present invention.

When two terminals use the same cyclic shift index and have the same Walsh sequence index, a cyclic shift index difference between the two terminals is a length of 4.

Table 8 shows the case where a sequence of a control signal is allocated, according to another embodiment of the present invention. There is no terminal using the same cyclic shift index. In addition, a cyclic shift index difference between terminals having the same Walsh sequence index is a length of 4. It can be seen that the number of adjacent terminals having a cyclic shift difference equal to or less than 1 per terminal is one and two in Tables 7 and 8, respectively. Thus, Tables 7 and 8 exhibit similar performances.

TABLE 6

Example of sequence allocation of reference signal

| Cyclic shift index | DFT sequence index | | |
|---|---|---|---|
| | 0 | 1 | 2 |
| 0 | ○ | | |
| 1 | | ○ | |
| 2 | | | ○ |
| 3 | ○ | | |
| 4 | | ○ | |
| 5 | | | ○ |
| 6 | ○ | | |
| 7 | | ○ | |
| 8 | | | ○ |
| 9 | ○ | | |
| 10 | | ○ | |
| 11 | | | ○ |

TABLE 7

Example of sequence allocation of control signal

| Cyclic shift index | Walsh sequence index | | | |
|---|---|---|---|---|
| | 0 | 1 | 2 | 3 |
| 0 | ○ | ○ | | |
| 1 | | | | |
| 2 | | | ○ | ○ |
| 3 | | | | |
| 4 | ○ | ○ | | |
| 5 | | | ○ | ○ |
| 6 | | | | |

TABLE 7-continued

Example of sequence allocation of control signal

| Cyclic shift index | Walsh sequence index | | | |
|---|---|---|---|---|
| | 0 | 1 | 2 | 3 |
| 7 | | | | |
| 8 | ○ | ○ | | |
| 9 | | | | |
| 10 | | | ○ | ○ |
| 11 | | | | |

TABLE 8

Example of sequence allocation of control signal

| Cyclic shift index | Walsh sequence index | | | |
|---|---|---|---|---|
| | 0 | 1 | 2 | 3 |
| 0 | ○ | | | |
| 1 | | ○ | | |
| 2 | | | ○ | |
| 3 | | | | ○ |
| 4 | ○ | | | |
| 5 | | ○ | | |
| 6 | | | ○ | |
| 7 | | | | ○ |
| 8 | ○ | | | |
| 9 | | ○ | | |
| 10 | | | ○ | |
| 11 | | | | ○ |

TABLE 9

Example of order of sequence allocation of the control signal of Table 7

| Cyclic shift index | Walsh sequence index | | | |
|---|---|---|---|---|
| | 0 | 1 | 2 | 3 |
| 0 | 1 | 7 | | |
| 1 | | | | |
| 2 | | | 4 | 10 |
| 3 | | | | |
| 4 | 2 | 8 | | |
| 5 | | | | |
| 6 | | | 5 | 11 |
| 7 | | | | |
| 8 | 3 | 9 | | |
| 9 | | | | |
| 10 | | | 6 | 12 |
| 11 | | | | |

Table 9 shows in detail the case where a sequence of a control signal is allocated to terminals in the example of sequence allocation of the control signal shown in Table 7. The sequence of the control signal is allocated to 12 terminals as the maximum number of terminals. However, since the sequence of the control signal might be allocated to a lesser number of terminals rather than the maximum number of terminals, the allocation order is determined so that the number of terminals using the same cyclic shift index is minimized and a cyclic shift index difference between allocated terminals is large.

Table 10 shows an order of the sequence allocation of the control signal of Table 8. The control signal sequences are allocated to 12 terminals as the maximum number of terminals. However, since the control signal sequences might be allocated to a lesser number of terminals rather than the maximum number of terminals, an allocation order is determined so that the number of terminals using the same cyclic shift index is minimized and a cyclic shift index difference between allocated terminals is large.

TABLE 10

Example of order of the sequence allocation of control signal of Table 8

| Cyclic shift index | Walsh sequence index | | | |
|---|---|---|---|---|
| | 0 | 1 | 2 | 3 |
| 0 | 1 | | | |
| 1 | | 7 | | |
| 2 | | | 4 | |
| 3 | | | | 10 |
| 4 | 2 | | | |
| 5 | | 8 | | |
| 6 | | | 5 | |
| 7 | | | | 11 |
| 8 | 3 | | | |
| 9 | | 9 | | |
| 10 | | | 6 | |
| 11 | | | | 12 |

When using sequence hopping, a resource used by a single terminal in first and second slots is changed by varying an allocation order of the first and second slots while using the same allocation pattern in the first and second slots.

For example, when an allocation order of Table 11 is used in the first slot for a reference signal, an allocation order of Table 12A can be used in the second slot. Similarly for a control signal, the sequence hopping can be performed by varying the allocation order of the first and second slots.

The sequence hopping is efficient to control interference between terminals in a cell. In Table 11, a terminal #1 mainly interferes with terminals #13, #7, and #12. That is, interference can be uniformized by diversifying terminals that interfere with a terminal to a maximum degree.

In particular, since terminals having the same cyclic shift index greatly interfere with each other at high speed, it is important that the same cyclic shift index used by a terminal in the first slot should not be used in the second slot.

For example, terminals #1 and #13 use the same cyclic shift 0 in Table 11. However, a terminal #1 uses the same cyclic shift index as a terminal #10 and a terminal #13 solely uses a cyclic shift index 5, in Table 12A. Likewise, terminals using the same cyclic shift index in the first slot use different cyclic shift indices in the second slot so that terminals that interfere with each other are diversified so as to uniformize interferences between terminals.

Table 12B shows a hopping method in which a cyclic shift index used by terminals in a slot #0 of Table 11 is changed in a slot #1.

TABLE 11

Slot #0

| Cyclic shift index | DFT sequence index | | |
|---|---|---|---|
| | 0 | 1 | 2 |
| 0 | 1 | | 13 |
| 1 | | 7 | |
| 2 | 2 | | 14 |
| 3 | | 8 | |
| 4 | 3 | | 15 |
| 5 | | 9 | |
| 6 | 4 | | 16 |
| 7 | | 10 | |

TABLE 11-continued

Slot #0

| Cyclic shift index | DFT sequence index | | |
|---|---|---|---|
| | 0 | 1 | 2 |
| 8 | 5 | | 17 |
| 9 | | 11 | |
| 10 | 6 | | 18 |
| 11 | | 12 | |

TABLE 12A

Slot #1

| Cyclic shift index | DFT sequence index | | |
|---|---|---|---|
| | 0 | 1 | 2 |
| 0 | 1 | | 11 |
| 1 | | 15 | |
| 2 | 6 | | 10 |
| 3 | | 14 | |
| 4 | 5 | | 9 |
| 5 | | 13 | |
| 6 | 4 | | 8 |
| 7 | | 18 | |
| 8 | 3 | | 7 |
| 9 | | 17 | |
| 10 | 2 | | 12 |
| 11 | | 16 | |

TABLE 12B

Slot #1

| Cyclic shift index | DFT sequence index | | |
|---|---|---|---|
| | 0 | 1 | 2 |
| 0 | | 12 | |
| 1 | 1 | | 13 |
| 2 | | 7 | |
| 3 | 2 | | 14 |
| 4 | | 8 | |
| 5 | 3 | | 15 |
| 6 | | 9 | |
| 7 | 4 | | 16 |
| 8 | | 10 | |
| 9 | 5 | | 7 |
| 10 | | 11 | |
| 11 | 6 | | 18 |

A hopping method in which only a time domain code sequence index (or, a time domain orthogonal cover index) is changed during code allocation of a control signal will be described. The hopping method in which only the time domain code sequence index is changed is relatively simpler than a hopping method including a change operation of a frequency domain code index.

18 terminals may be allocated as shown in Table 13. The slot #0 has a Walsh sequence index in which a line 0 is adjacent to a line 1 and is not adjacent to a line 2. The line 1 is adjacent to both of the lines 1 and 2. In this case, a sequence may be allocated in the slot #1, as shown in Table 14 or 15.

Referring to Table 14, all terminals allocated to the line 2 are moved to the line 3. In the slot #1, for the line 0, both of the lines 1 and 3 have adjacent Walsh sequence indices. The line 1 is adjacent to a terminal of the line 0 and is not adjacent to a terminal of the line 3.

That is, when all positions of the slot #0 and the slot #1 are considered, the lines 0 and 1 lie in the same position. That is, interference is uniformized. In the slot #0, the lines 2 and 1 are adjacent to each other. Since these terminals are positioned at the line 3 in the slot #1 and are adjacent to the line 0, interference is randomized and uniformized.

In Table 15, when the slot #0 is changed to the slot #1, calculation of modulo 3 is performed while increasing a Walsh index by one. That is, terminals allocated to the lines 0, 1 and 2 in the slot #0 are respectively allocated to the lines 1, 2 and 0 in the slot #1. As described above, in this case, interference is randomized and uniformized.

<First Slot>

TABLE 13

Slot #0

| Cyclic shift index | Walsh sequence index | | | |
|---|---|---|---|---|
| | 0 | 1 | 2 | 3 |
| 0 | 1 | 7 | | |
| 1 | | | 13 | |
| 2 | 2 | 8 | | |
| 3 | | | 14 | |
| 4 | 3 | 9 | | |
| 5 | | | 15 | |
| 6 | 4 | 10 | | |
| 7 | | | 16 | |
| 8 | 5 | 11 | | |
| 9 | | | 17 | |
| 10 | 6 | 12 | | |
| 11 | | | 18 | |

<Second Slot Configuration A>

TABLE 14

Slot #1 - A

| Cyclic shift index | Walsh sequence index | | | |
|---|---|---|---|---|
| | 0 | 1 | 2 | 3 |
| 0 | 1 | 7 | | |
| 1 | | | | 13 |
| 2 | 2 | 8 | | |
| 3 | | | | 14 |
| 4 | 3 | 9 | | |
| 5 | | | | 15 |
| 6 | 4 | 10 | | |
| 7 | | | | 16 |
| 8 | 5 | 11 | | |
| 9 | | | | 17 |
| 10 | 6 | 12 | | |
| 11 | | | | 18 |

<Second Slot Configuration B>

TABLE 15

Slot #1 - B

| Cyclic shift index | Walsh sequence index | | | |
|---|---|---|---|---|
| | 0 | 1 | 2 | 3 |
| 0 | | 1 | 7 | |
| 1 | 13 | | | |
| 2 | | 2 | 8 | |
| 3 | 14 | | | |
| 4 | | 3 | 9 | |
| 5 | 15 | | | |
| 6 | | 4 | 10 | |
| 7 | 16 | | | |
| 8 | | 5 | 11 | |
| 9 | 17 | | | |

TABLE 15-continued

Slot #1 - B

| Cyclic shift index | Walsh sequence index | | | |
|---|---|---|---|---|
| | 0 | 1 | 2 | 3 |
| 10 | | | 6 | 12 |
| 11 | 18 | | | |

When a sequence of the control signal of the first slot is allocated as shown in Table 5, if sequence hopping in which only a time domain sequence can be changed on a slot-by-slot basis is performed, a sequence can be allocated after performing hopping in the second slot, as shown in Table 16.

In sequence hopping changed from Table 5 to Table 16, Walsh sequence indices of two terminals allocated by the same cyclic shift index are exchanged with each other. Such sequence hopping has the following advantages.

First, a terminal #3 has the same Walsh sequence index as a terminal #8, in Table 5. However, the terminal #3 is moved so as to have a different Walsh sequence index to that of the terminal #8, in Table 16. Two terminals to which the same cyclic shift index is allocated are all affected in the same way. That is, terminals having the same Walsh sequence among terminals to which adjacent cyclic shift indices are allocated in a first slot may have different Walsh sequences in a second slot. Since terminals having different Walsh sequence indices do not greatly interfere with each other in an environment having many terminals moving at low speed, interference can be diversified by performing the above hopping.

Second, a single terminal is allocated to a single cyclic shift index (that is, one of terminals #13, #14, #15, #16, #17 and #18), for example, the terminal #13 is adjacent to a Walsh sequence index while having a cyclic shift index in which the cyclic shift indices #1 and #8 are adjacent. On the other hand, the terminal #13 is not adjacent to the Walsh sequence index while having a cyclic shift index in which the terminal #13 is adjacent to the terminals #7 and #2. After the hopping is performed, the terminal #13 is adjacent to the Walsh sequence index while having a cyclic shift index in which the terminal #13 is adjacent to the terminals #7 and #2 in Table 16. On the other hand, the terminal #13 is not adjacent to the Walsh sequence index while having a cyclic shift index in which the terminal #1 is adjacent to the terminals #1 and #8. Since terminals having adjacent cyclic shift indices greatly interfere with each other when the Walsh sequences are the same or are not adjacent to each other, interference can be varied by performing the above hopping in two slots in order to diversify the interference.

TABLE 16

Example of sequence hopping of control signal

| Cyclic shift index | Walsh sequence index | | | |
|---|---|---|---|---|
| | 0 | 1 | 2 | 3 |
| 0 | 7 | 1 | | |
| 1 | | | | 13 |
| 2 | | 8 | 2 | |
| 3 | 14 | | | |
| 4 | | | 9 | 3 |
| 5 | | 15 | | |
| 6 | 4 | | | 10 |
| 7 | | | 16 | |
| 8 | 11 | 5 | | |
| 9 | | | | 17 |

TABLE 16-continued

Example of sequence hopping of control signal

| Cyclic shift index | Walsh sequence index | | | |
|---|---|---|---|---|
| | 0 | 1 | 2 | 3 |
| 10 | | 12 | 6 | |
| 11 | | | | 18 |

Similarly, when the first slot has the allocation of Table 13, the hopping can be performed so that the second slot has the allocation of Table 17. In Table 17, only when a cyclic shift index is 0, 4 or 8, are Walsh sequence indices exchanged with each other. Thus, interference between terminals to which Walsh sequence indices 0 and 1 are allocated, is diversified. In the other terminals #13, #14, #15, #16, #17 and #18, adjacent terminals are partially changed so that interference is diversified.

Table 16 shows another embodiment of the present invention. In Table 16, a cyclic shift index difference needs to be 4. Like in the above case, only when the cyclic shift index is 2, 6 or 10, may Walsh sequence indices be exchanged with each other. In this case, in terminals #13, #14, #15, #16, #17 and 18, adjacent terminals are partially changed so that interference is diversified.

TABLE 17

Slot #1 - C

| Cyclic shift index | Walsh sequence index | | | |
|---|---|---|---|---|
| | 0 | 1 | 2 | 3 |
| 0 | 7 | 1 | | |
| 1 | | | | 13 |
| 2 | 2 | 8 | | |
| 3 | | | | 14 |
| 4 | 9 | 3 | | |
| 5 | | | | 15 |
| 6 | 4 | 10 | | |
| 7 | | | | 16 |
| 8 | 11 | 5 | | |
| 9 | | | | 17 |
| 10 | 6 | 12 | | |
| 11 | | | | 18 |

Figure 6:
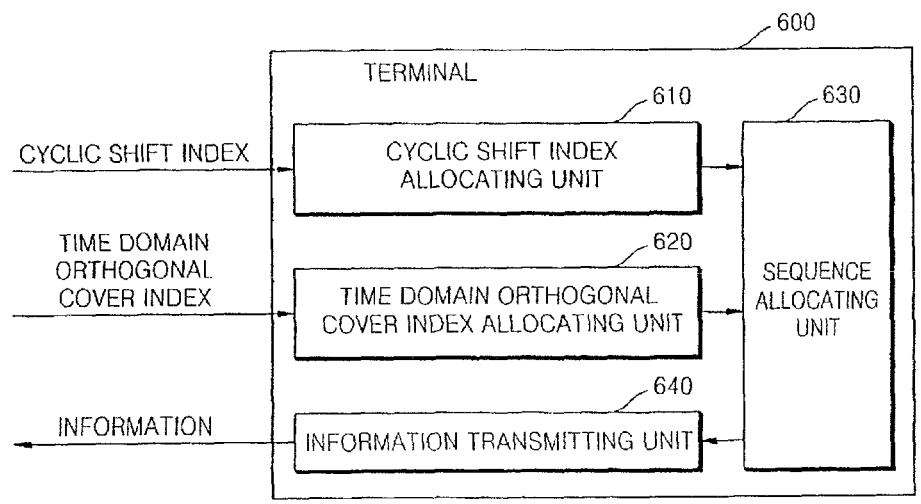
FIG. 6 illustrates a terminal, according to an embodiment of the present invention.

FIG. 6 illustrates a terminal 600 selected from among a plurality of terminals that commonly use a resource including a frequency domain and a time domain, according to an embodiment of the present invention.

The terminal 600 includes a cyclic shift index allocating unit 610 for receiving an allocation of a cyclic shift index from a base station, and a time domain orthogonal cover index allocating unit 620 for receiving a time domain orthogonal cover index.

Each of the cyclic shift index allocating unit 610 and the time domain orthogonal cover index allocating unit 620 may receive an index directly from a pertaining of the base station or may implicitly allocate an index according to a rule of the base station.

Each index is transmitted to a sequence allocating unit 630 in order to allocate a sequence. The sequence allocating unit 630 multiplies information to be transmitted to the base station by each of the cyclic shift index and the time domain orthogonal cover index so as to transmit the multiplication result to the base station. This function is performed by an information transmitting unit 640.

Figure 7:
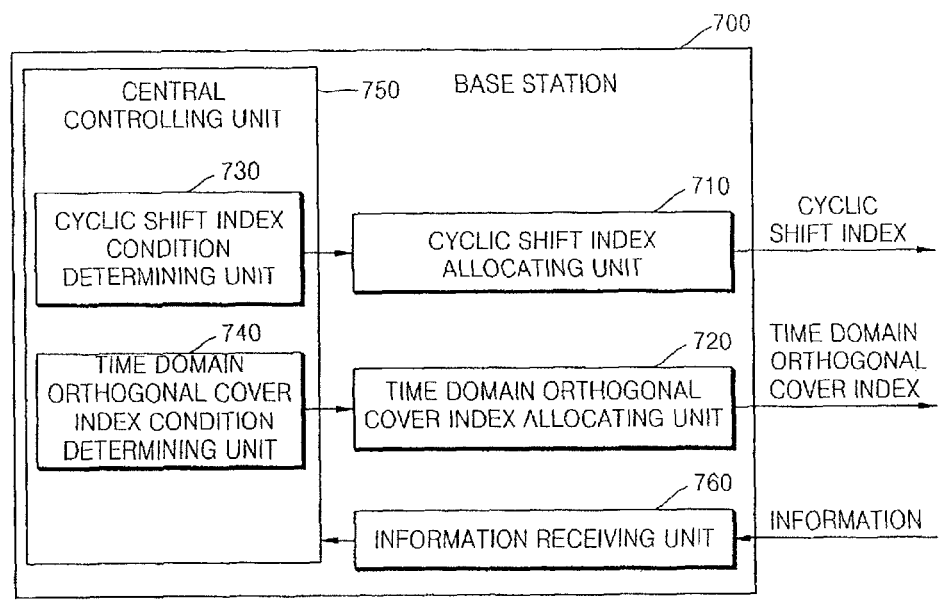
FIG. 7 illustrates a base station, according to an embodiment of the present invention.

FIG. 7 illustrates a base station 700, according to an embodiment of the present invention.

The base station 700 needs to allocate a cyclic shift index and a time domain orthogonal cover index to each terminal in order to identify terminals using the same resource. This function is performed by a cyclic shift index allocating unit 710 and a time domain orthogonal cover index allocating unit 720.

In addition, the base station 700 includes a central controlling unit 750 having a cyclic shift index condition determining unit 730 for determining a cyclic shift index to be transmitted according to changing of a slot and a time domain orthogonal cover index condition determining unit 740.

The base station 700 includes an information receiving unit 760 receiving information such as ACK/NAK information or scheduling information from a terminal. The information received from the information receiving unit 760 needs to be multiplied by a sequence for identifying terminals. The central controlling unit 750 identifies terminals and interprets the information.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet).

The computer readable recording medium can also be distributed over network coupled computer systems so that the computer readable code is stored and executed in a distributed fashion. Also, functional programs, codes, and code segments for accomplishing the present invention can be easily construed by programmers of ordinary skill in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of allocating a code by a base station that allocates a resource block defined by a plurality of symbols and a plurality of subcarriers to a plurality of terminals, the method comprising:
    allocating a cyclic shift index of a first sequence to each terminal; and
    allocating a sequence index of a second sequence to each terminal,
    wherein a code that is applied to an uplink signal transmitted by each terminal is determined by the cyclic shift index and the sequence index,
    wherein, when the same sequence index is allocated to a first terminal and a second terminal among the plurality of terminals, a difference between the cyclic shift index allocated to the first terminal and the cyclic shift index allocated to the second terminal is equal to or greater than 2.

2. The method of claim 1, wherein a number of terminals to which the same cyclic shift index is allocated among the plurality of terminals is equal to or less than 2.

3. The method of claim 1, wherein, when the same cyclic shift index is allocated to the first terminal and the second terminal, the second sequences of the first terminal and the second terminal have orthogonality of a length 2.

4. The method of claim 1, wherein the second sequence is Walsh sequence, and
    only three sequence indices among four sequence indices of the Walsh sequence are allocated to the plurality of terminals.

5. A method of transmitting an uplink signal by a first terminal among a plurality of terminals to which a resource block defined by a plurality of symbols and a plurality of subcarriers is allocated, the method comprising:
    determining a cyclic shift index of a first sequence and a sequence index of a second sequence; and
    applying a code that is determined by the cyclic shift index and the sequence index to the uplink signal,
    wherein, when the same sequence index is allocated to the first terminal and a second terminal among the plurality of terminals, a difference between the cyclic shift index allocated to the first terminal and the cyclic shift index allocated to the second terminal is equal to or greater than 2.

6. The method of claim 5, wherein a number of terminals for which the same cyclic shift index is determined among the plurality of terminals is equal to or less than 2.

7. The method of claim 5, wherein, when the same cyclic shift index is determined for the first terminal and the second terminal, the second sequences of the first terminal and the second terminal have orthogonality of a length 2.

8. The method of claim 5, wherein the second sequence is Walsh sequence, and
    only three sequence indices among four sequence indices of the Walsh sequence are allocated to the plurality of terminals.

9. An apparatus for allocating a code by a base station that allocates a resource block defined by a plurality of symbols and a plurality of subcarriers to a plurality of terminals, the apparatus comprising:
    a first allocating unit configured to allocate a cyclic shift index of a first sequence to each terminal; and
    a second allocating unit configured to allocate a sequence index of a second sequence to each terminal,
    wherein a code that is applied to an uplink signal transmitted by each terminal is determined by the cyclic shift index and the sequence index,
    wherein, when the same sequence index is allocated to a first terminal and a second terminal among the plurality of terminals, a difference between the cyclic shift index allocated to the first terminal and the cyclic shift index allocated to the second terminal is equal to or greater than 2.

10. The apparatus of claim 9, wherein a number of terminals to which the same cyclic shift index is allocated among the plurality of terminals is equal to or less than 2.

11. The apparatus of claim 9, wherein, when the same cyclic shift index is allocated to the first terminal and the second terminal, the second sequences of the first terminal and the second terminal have orthogonality of a length 2.

12. The apparatus of claim 9, wherein the second sequence is Walsh sequence, and
    only three sequence indices among four sequence indices of the Walsh sequence are allocated to the plurality of terminals.

13. An apparatus for transmitting an uplink signal by a first terminal among a plurality of terminals to which a resource block defined by a plurality of symbols and a plurality of subcarriers is allocated, the apparatus comprising:
    a first allocating unit configured to determine a cyclic shift index of a first sequence and a sequence index of a second sequence; and a second allocating unit configured to apply a code that is determined by the cyclic shift index and the sequence index to the uplink signal, wherein, when the same sequence index is allocated to the first terminal and a second terminal among the plurality of terminals, a difference between the cyclic shift index allocated to the first terminal and the cyclic shift index allocated to the second terminal is equal to or greater than 2.

14. The apparatus of claim 13, wherein a number of terminals for which the same cyclic shift index is determined among the plurality of terminals is equal to or less than 2.

15. The apparatus of claim 13, wherein, when the same cyclic shift index is determined for the first terminal and the second terminal, the second sequences of the first terminal and the second terminal have orthogonality of a length 2.

16. The apparatus of claim 13, wherein the second sequence is Walsh sequence, and only three sequence indices among four sequence indices of the Walsh sequence are allocated to the plurality of terminals.

* * * * *